(12) United States Patent
Souschek et al.

(10) Patent No.: US 10,479,258 B2
(45) Date of Patent: Nov. 19, 2019

(54) MOTOR VEHICLE

(71) Applicant: FORD MOTOR COMPANY, Dearborn, MI (US)

(72) Inventors: Rainer Souschek, Aachen (DE); Guenter Hans Grosch, Vettweiss (DE); Thomas Gerhards, Niederzier (DE); Tobias Ricke, Cologne (DE); Alexandra Gatzweiler, Aachen (DE); Philipp Wolf, Cologne (DE)

(73) Assignee: FORD MOTOR COMPANY, Dearborn, MI (US)

( * ) Notice: Subject to any disclaimer, the term of this patent is extended or adjusted under 35 U.S.C. 154(b) by 82 days.

(21) Appl. No.: 15/809,808

(22) Filed: Nov. 10, 2017

(65) Prior Publication Data
US 2018/0126892 A1  May 10, 2018

(30) Foreign Application Priority Data
Nov. 10, 2016  (DE) .................. 10 2016 222 071

(51) Int. Cl.
| B60P 3/073 | (2006.01) |
| B60R 5/00 | (2006.01) |
| B62K 15/00 | (2006.01) |
| B60R 9/00 | (2006.01) |
| B62K 3/00 | (2006.01) |

(Continued)

(52) U.S. Cl.
CPC .............. *B60P 3/073* (2013.01); *B60L 53/14* (2019.02); *B60L 53/30* (2019.02); *B60L 58/12* (2019.02); *B60R 5/006* (2013.01); *B60R 9/00* (2013.01); *B62K 3/002* (2013.01); *B62K 15/006* (2013.01); *B60L 8/003* (2013.01); *B60L 2200/20* (2013.01); *B60P 3/06* (2013.01); *B60R 19/48* (2013.01);

(Continued)

(58) Field of Classification Search
CPC .. B60P 3/073; B60P 3/06; B60L 58/12; B60L 53/14; B60L 53/30; B60L 2200/20; B60L 8/003; B60R 9/00; B60R 5/006; B60R 19/48; B62K 2202/00; B62K 3/002; B62K 15/006; B62K 2204/00; B62K 2700/56

See application file for complete search history.

(56) References Cited

U.S. PATENT DOCUMENTS

| 4,917,430 A * | 4/1990 | Lawrence | ................. B60R 7/04 |
| | | | 224/281 |
| 5,150,939 A * | 9/1992 | Simin | .................. B60Q 1/2692 |
| | | | 280/166 |

(Continued)

FOREIGN PATENT DOCUMENTS

| CN | 203252094 | 10/2013 |
| DE | 102012018219 | 3/2014 |
| DE | 102013020180 | 4/2015 |

*Primary Examiner* — Darlene P Condra
(74) *Attorney, Agent, or Firm* — Vichit Chea; Brooks Kushman P.C.

(57) ABSTRACT

A motor vehicle having an auxiliary stowage compartment for transporting a compact scooter. The motor vehicle having an engine compartment, a passenger compartment, a luggage compartment in addition to the auxiliary stowage compartment. The auxiliary stowage compartment is accessible from the outside of the motor vehicle, and is opened and closed by a cover that is part of the outer skin of the vehicle wherein the additional stowage compartment is configured to receive a compact scooter.

15 Claims, 2 Drawing Sheets

(51) Int. Cl.
*B60L 53/14* (2019.01)
*B60L 53/30* (2019.01)
*B60L 58/12* (2019.01)
*B60R 19/48* (2006.01)
*B60P 3/06* (2006.01)
*B60L 8/00* (2006.01)

(52) U.S. Cl.
CPC ...... *B62K 2202/00* (2013.01); *B62K 2204/00* (2013.01)

(56) References Cited

U.S. PATENT DOCUMENTS

| | | | | |
|---|---|---|---|---|
| 5,823,598 A * | 10/1998 | Clare | ...................... | B60R 11/06 296/37.6 |
| 5,845,952 A * | 12/1998 | Albertini | ................... | B60P 3/14 296/37.6 |
| 5,848,818 A * | 12/1998 | Flueckinger | .............. | B60R 9/00 296/37.6 |
| 6,003,923 A * | 12/1999 | Scott | ....................... | B60R 11/06 296/37.6 |
| 6,079,741 A * | 6/2000 | Mayer | ....................... | B60R 9/00 224/404 |
| 6,474,715 B2 * | 11/2002 | Fukushima | ............... | B60R 5/04 296/37.1 |
| 6,485,077 B1 * | 11/2002 | Foster | ...................... | B60R 11/06 296/183.1 |
| 6,966,593 B2 * | 11/2005 | Plentis | ..................... | B60R 9/02 224/402 |
| 7,219,941 B1 * | 5/2007 | San Paolo | ................. | B60R 9/00 224/404 |
| 7,451,848 B2 | 11/2008 | Flowers et al. | | |
| 7,686,365 B2 * | 3/2010 | Thelen | ..................... | B60R 9/00 220/480 |
| 8,038,195 B1 * | 10/2011 | Hutcheson | ................ | B60R 9/00 296/136.04 |
| 8,814,246 B2 * | 8/2014 | Weller | ..................... | B60R 9/00 296/100.08 |
| 8,827,343 B2 * | 9/2014 | Peters | ..................... | B60P 1/435 296/37.6 |
| 9,211,932 B1 | 12/2015 | Huennekens et al. | | |
| 9,802,548 B2 * | 10/2017 | Wilson | .................... | B60R 9/065 |
| 2005/0173175 A1 * | 8/2005 | Lee | ......................... | B62K 3/002 180/208 |
| 2006/0061116 A1 * | 3/2006 | Haaberg | ................... | B60P 1/003 296/37.6 |
| 2009/0001748 A1 * | 1/2009 | Brown | .................... | B60R 7/005 296/37.8 |
| 2012/0123623 A1 * | 5/2012 | Nguyen | .................... | B60K 6/48 701/22 |
| 2012/0256386 A1 * | 10/2012 | Benarrouch | ........... | B62K 3/002 280/87.05 |
| 2013/0062377 A1 * | 3/2013 | Turner | .................... | B62K 3/002 224/276 |
| 2015/0246705 A1 | 9/2015 | Sharkan et al. | | |
| 2016/0023586 A1 | 1/2016 | Potticary et al. | | |

* cited by examiner

MOTOR VEHICLE

CROSS-REFERENCE TO RELATED APPLICATIONS

This application claims foreign priority benefits under 35 U.S.C. § 119(a)-(d) to DE Application 10 2016 222 071.3 filed Nov. 10, 2016, which is hereby incorporated by reference in its entirety.

TECHNICAL FIELD

The present invention concerns a motor vehicle that is adapted to transport an individual mobility apparatus.

BACKGROUND

The high traffic density of motor vehicles in cities leads increasingly frequently to the requirement to park motor vehicles outside the city center or at the city limits, and bridge the so-called "last mile" with an individual mobility apparatus. In particular, the mobility apparatus should be carried by the motor vehicle.

DE 10 2015 110 730 A1 discloses a lifting arrangement for a vehicle which is configured to be attached to the vehicle. A lifting arm is coupled rotatably to the holder. Furthermore, a docking structure is carried by the lifting arm. The docking structure is configured to lift the personal mobility means. The docking structure also contains an electrical port for electrical connection to the electrical port of the personal mobility means.

A further mobility solution for the last mile is disclosed in U.S. Pat. No. 9,211,932 B1. A unicycle is disclosed with its own drive. The self-stabilizing unicycle is optionally either decoupled from a motor vehicle and used as an independent transport means, or integrated in dismantled state in the motor vehicle. The self-stabilizing unicycle consists of a cycle body and a wheel which is attached rotatably to the cycle body, and a motor which drives the wheel. The assembled self-stabilizing unicycle is an individual transport means. The unicycle may be dismantled and the wheel of the unicycle can be used in dismantled state for the wheel suspension of the motor vehicle.

SUMMARY

It is an object of the present invention to provide an advantageous motor vehicle for transporting a mobility apparatus to cover the so-called "last mile". In particular, it is an object of the present invention to propose a solution which does not reduce the available stowage space.

The present invention discloses a motor vehicle with which a compact scooter can be transported. The motor vehicle comprises an engine bay, a passenger compartment, a luggage compartment and an auxiliary stowage compartment. The additional stowage compartment is accessible from the outside of the motor vehicle and is configured to receive a compact scooter.

According to one embodiment of the motor vehicle according to the invention, the dimensions of the additional stowage compartment correspond to the dimensions of the compact scooter. The dimensions of the compact scooter may vary greatly depending on use. Examples include a collapsible kick scooter as a vehicle for one person, or a foldable transport scooter suitable for transporting luggage.

According to one embodiment of the motor vehicle according to the invention, the additional stowage compartment has a cover configured for opening and closing. The cover is configured to completely or partially close the stowage compartment. The covers may be formed in various ways. Examples include covers provided with a hinge for folding back, covers provided with a rail hinge for sliding, separate covers provided with a push closure, covers provided with a bayonet closure, or foldable covers. The types of covers are merely examples and indicate some of the many variations of covers that may be provided on a motor vehicle.

According to one embodiment, the cover is a part of the outer skin of the motor vehicle. The cover here serves, for example, as protection from view and/or as protection from dirt and/or as an aerodynamic element. The design of the cover may be matched to the design of the outer skin of the motor vehicle.

The cover may be designed to be lockable. It may be locked for example via the central locking during travel, or when the motor vehicle is locked after travel. This prevents the scooter from being removed by an unauthorized person, e.g. at traffic lights or in a car park.

The additional stowage compartment may be arranged in the bumper, in the side member, or in the sill. These locations are most suitable for the provision of an additional stowage compartment in modern motor vehicles.

The additional stowage compartment has a device which is configured to allow a tool-free connection by force fit or form fit between the compact scooter and the device. The term "tool-free" here means that no additional aids are required to open the device. However, the device is configured such that the compact scooter is held in position during travel without falling out of the anchorage because of vibrations. For example, spring clamps could be used to hold the compact scooter firmly in position and can easily be opened by a driver of the motor vehicle in order to remove the compact scooter.

The additional stowage compartment may have a slide-in module such as, for example, a slide-in tray or drawer.

The stowage compartment may have a charging station for charging a battery of the compact scooter. The battery of the compact scooter may have connected to the charging station of the additional stowage compartment as soon as the compact scooter is inserted, suspended or otherwise attached in the additional stowage compartment. This may take place with a simple cable and plug connection, a charging tray or by inductive charging methods.

The charging station may be configured to charge the battery of the compact scooter during travel. Charging the battery of the compact scooter during travel leads to the advantage that the battery of the compact scooter is partially or even fully charged when the journey is completed. The compact scooter is then available for use at the end of the journey.

The motor vehicle may have a battery system that feeds an electric motor. In such a motor vehicle, the charging station may be configured to charge the battery of the compact scooter while charging the battery system. For example, the battery system of the motor vehicle may be charged externally. Charging the battery of the compact scooter while charging the battery system of the motor vehicle helps maintain the full performance of the battery system of the motor vehicle. The range of the motor vehicle is not adversely affected thereby. Alternatively, the battery system of the motor vehicle may be charged by an internal combustion engine or fuel cell. Here again, charging the battery system leads to charging of the battery of the compact scooter.

The charging station may be configured to transmit a state of charge of the battery of the compact scooter to one of the instruments of the motor vehicle. The instrument may indicate the state of charge of the compact scooter to the driver. The instrument may be integrated into the dashboard of the motor vehicle. For example, the driver of the motor vehicle may read or be told the state of charge of the battery of the compact scooter during travel, so that even during the journey, the driver receives information on whether the compact scooter of the motor vehicle can be available for bridging the so-called "last mile".

According to another aspect of this disclosure, a motor vehicle is disclosed in combination with a compact scooter according to the invention.

The compact scooter is provided with a battery and is configured to be driven electrically. Alternatively, other drive systems may be fitted, for example solar-powered drive systems or drive systems based on fuel cell technology.

The compact scooter may be configured to be charged by the motor vehicle during operation of the motor vehicle and/or be charged during charging of the battery system of the motor vehicle.

The compact scooter may be foldable and include a folding mechanism that folds to a collapsed state.

The compact scooter may have at least one wheel. The types of compact scooter vary widely and may include unicycle scooters, two-wheeled scooters such as for example kick scooters or scooter rollers, three-wheeled scooters or four-wheeled scooters which may be used as transport scooters or luggage scooters. Alternatively, scooter bikes are possible. Furthermore, compact scooters with more than four wheels are possible.

Further features, properties and advantages of the present invention arise from the description below of an exemplary embodiment, given with reference to the enclosed figures.

DETAILED DESCRIPTION

Figure 1:
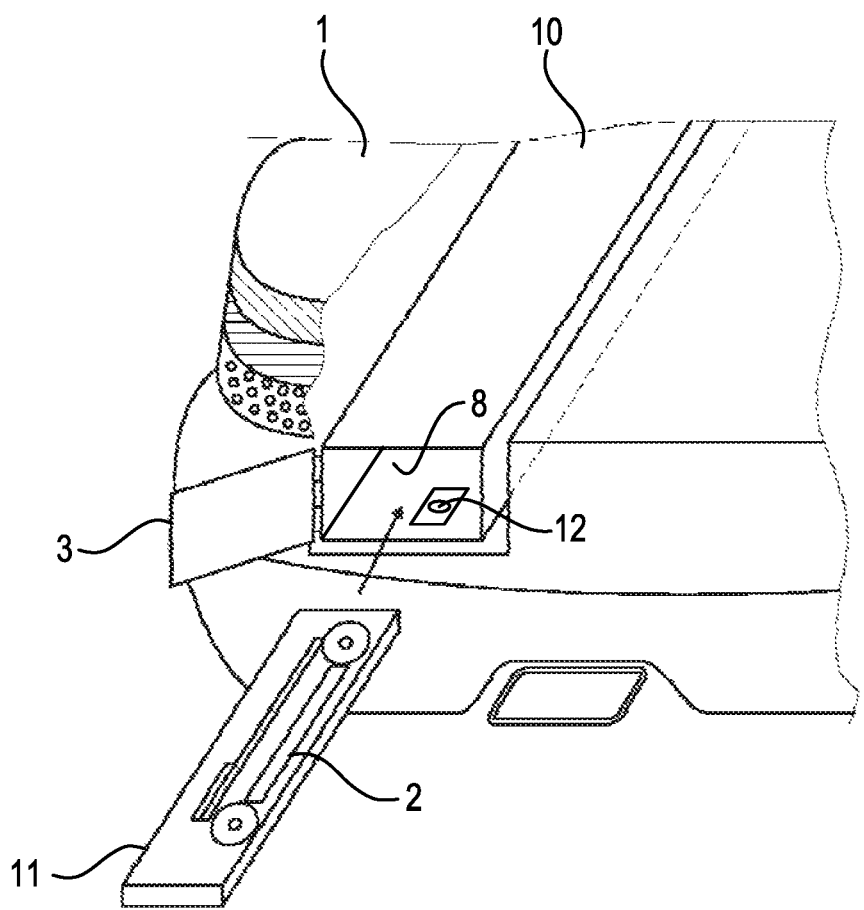
FIG. 1 shows a diagrammatic view of a first exemplary embodiment for transport of a compact scooter in a side member of a motor vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention provides a motor vehicle 1 for transporting a compact scooter 2. A simple solution is sought for bridging the distance in urban areas between the parked vehicle and the actual destination of the driver of the motor vehicle 1. The desired transport means should be ready to use at the end of the journey with the motor vehicle 1, and should be easy to extract. Furthermore, the transport means must not reduce the usable space available in the motor vehicle 1. An electrically powered so-called "last mile" scooter would be ideal for this. The compact scooter 2 of the present invention constitutes one such "last mile" scooter which is useful in large urban areas.

An electrically driven compact scooter 2 may solve the so-called "last mile" problems of individual mobility. In particular, European urban areas such as London with 3 million inhabitants within the inner city, plus 8 million inhabitants in the outer city region, plus an additional 14 million inhabitants in the catchment area of the city, or China's mega-cities such as Shanghai with 15 million inhabitants in the inner city, require a clever solution to the so-called "last mile" problem. Because of the lack of space in inner cities and because of the lack of usable space in motor vehicles 1 which must also be available at all times, one option for an additional stowage compartment lies in integrating this in the bodywork of the motor vehicle 1 or in the underfloor area. This additional stowage compartment can be filled with a simple battery-powered scooter.

FIG. 1 shows a motor vehicle 1 for transporting a compact scooter 2, wherein in this exemplary embodiment, the additional stowage compartment 8 in the motor vehicle 1 is situated in one of the side members 10 of the motor vehicle 1. The use of the side member 10 for the additional stowage compartment 8 does not reduce the useful load space of the motor vehicle 1 normally available. The full availability of the load space in the motor vehicle 1 is thus retained. The side member 10 of a motor vehicle 1 is just one example of integration of the additional stowage compartment 8. Alternatively, the additional stowage compartment 8 may be integrated in the front or rear bumper or in the sill of one of the doors of the motor vehicle 1. Furthermore, an additional stowage compartment 8 may be integrated in a cavity of the bodywork or in a cavity of the underfloor structure.

The opening of the side member 10 in FIG. 1 is provided with a cover 3. The cover 3 serves as protection from view and/or protection from dirt. At the same time, it can guarantee that the aerodynamics of the motor vehicle 1 are not adversely affected by an open stowage compartment 8. The design of the cover 3 is adapted to the design of the outer skin of the bodywork. In FIG. 1, the cover 3 is shown as a hatch. It is attached to a hinge. Alternatively, other covers 3 may be used. Examples here include a cover 3 which slides to open, a foldable cover 3, or a cover 3 which is not connected to the bodywork and can be removed like a lid 3.

To use the additional stowage compartment 8 in the side member 10 of the motor vehicle 1 in FIG. 1, the compact scooter is folded up and placed in a slide-in module 11. The slide-in module 11 has dimensions such that this can be inserted in the additional stowage compartment 8 of the side member 10. Furthermore, the slide-in module 11 is configured to receive a foldable compact scooter 2. Also, the slide-in module 11 may be configured to contain a charging tray for the compact scooter 2 (not shown in FIG. 1). After inserting the slide-in module 11 in the side member 10, the charging tray, or charging station 12, may be connected to the battery system of the motor vehicle 1.

The compact scooter may be attached with spring clamps in this exemplary embodiment to hold it in position during travel. This method of fixing is tool-free and can be quickly opened and closed.

An electrically driven, foldable compact scooter 2, which in the collapsed state does not exceed the dimensions of the slide-in module 11, is placed in the slide-in module 11 and connected to the charging tray of the slide-in module 11. The compact scooter 2 may be placed precisely in the charging tray.

The battery 14 in the compact scooter 2 may be charged. The motor vehicle 1 may be a hybrid vehicle and the battery 14 of the compact scooter 2 may be charged either by an internal combustion engine or by a battery system used for the electric motor. The battery 14 of the compact scooter 2 may be further charged when the battery system for the electric motor of the hybrid vehicle is charged.

The charge state of the battery 14 of the compact scooter 2 may be transmitted to the driver via an instrument of the motor vehicle 1.

Figure 2:
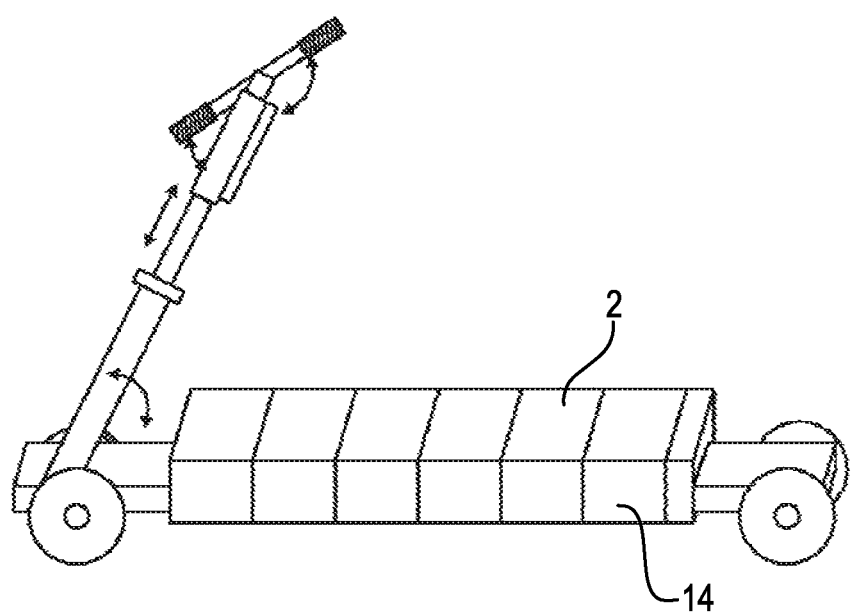
FIG. 2 shows an exemplary embodiment of a foldable compact scooter which is depicted diagrammatically in unfolded state.

A foldable compact scooter 2 is shown in FIG. 2. The compact scooter 2, shown in the unfolded state in FIG. 2, has a battery 14 and is driven electrically. The compact scooter 2 may also have a free-wheel mode and an electric drive mode. In cases when the battery 14 of the compact scooter 2 is not charged, or the battery charge is not sufficient to bridge the distance, the compact scooter 2 has the flexibility to be used without the electric drive.

The different versions of compact scooter 2 vary greatly. Compact scooters 2 are available with a handle or with a handlebar on which a mobile device or navigation system can be attached. Secondly, there are compact scooters 2 that are designed to transport luggage, heavy loads, the elderly or the disabled. The compact scooter 2 may have four wheels. Four-wheeled compact scooters 2 may be flexibly constructed to provide two separate compact scooters 2. The compact scooter 2 may be configured with two wheels for use as a kick scooter. A second compact scooter 2 may alternatively serve as a trailer.

The compact scooter 2 may be made of a composite material to make the compact scooter 2 lightweight and hence suitable for anyone to stow, remove and use. Alternatively, any other type of lightweight material may be used for construction of the compact scooter 2. The light weight of the compact scooter 2 in conjunction with small dimensions in the collapsed state is particularly advantageous for business people, tourists, inhabitants of the suburbs of a large city, tradespeople and the elderly.

The present invention has been explained in detail for illustrative purposes with reference to an exemplary embodiment. A person skilled in the art will however find that deviations from the exemplary embodiment are possible. Thus, the compact scooter 2 may be a unicycle scooter or a tricycle scooter. Also, the use of a scooter bicycle is possible. In very large vehicles with corresponding bodywork, scooters with wheels measuring several inches in size can also be accommodated. Also, compact scooters 2 other than the types cited are possible, as will be evident to a skilled person. The invention should not therefore be limited by the exemplary embodiment but merely by the attached claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
   a motor vehicle;
   an individual mobility apparatus; and
   an auxiliary stowage compartment accessible from the outside of the motor vehicle that is adapted to receive the individual mobility apparatus, wherein the auxiliary stowage compartment includes a charging station for charging a battery of a compact scooter during travel, and wherein the charging station is configured to transmit a state of charge of the battery of the compact scooter to an instrument of the motor vehicle, and wherein the instrument indicates the state of charge of the compact scooter.

2. The apparatus as claimed in claim 1, wherein the individual mobility apparatus is a compact scooter, and wherein dimensions of the auxiliary stowage compartment correspond to the dimensions of the compact scooter.

3. The apparatus as claimed in claim 1, wherein the auxiliary stowage compartment has a cover that is openable and closable, wherein the cover completely or partially closes the auxiliary stowage compartment.

4. The apparatus as claimed in claim 3, wherein the cover is a part of an outer skin of the motor vehicle.

5. The apparatus as claimed in of claim 1, wherein the auxiliary stowage compartment is arranged in a location selected from the group consisting of:
   a bumper;
   a side member; and
   a sill.

6. The apparatus as claimed in claim 1, wherein the auxiliary stowage compartment includes a slide-in module that is adapted to contain the individual mobility apparatus.

7. The apparatus as claimed in claim 1 wherein the individual mobility apparatus is a compact scooter.

8. The apparatus as claimed in claim 7, wherein the compact scooter has a battery and is configured to be driven electrically.

9. The apparatus as claimed in claim 8, wherein the compact scooter is configured to be charged by the motor vehicle during operation of the motor vehicle.

10. The apparatus as claimed in claim 7, wherein the compact scooter is foldable.

11. The apparatus as claimed in claim 7, wherein the compact scooter has at least one wheel.

12. A motor vehicle and a scooter in combination, comprising:
   a vehicle body;
   a scooter stowage compartment provided in the vehicle body to be accessible from the outside of the motor vehicle; and
   a slide-in module configured to receive the scooter, wherein the module slides into and out of the scooter stowage compartment.

13. The combination as claimed in claim 12 further comprising:
   a cover for an opening in the scooter stowage compartment, the cover being opened to provide access to the scooter stowage compartment and closed to seal the opening in the scooter stowage compartment and form part of an outer skin of the motor vehicle.

14. The combination as claimed in claim 12 further comprising: a charging station operative to charge a battery of the scooter when the scooter is disposed in the scooter stowage compartment during travel, and wherein the charging station is configured to transmit a state of charge of the battery of the compact scooter to an instrument of the motor vehicle.

15. The combination as claimed in claim 12 wherein the scooter is folded to a storage configuration to fit inside the module.

* * * * *